July 23, 1940.   J. M. CHRISTMAN   2,209,259
MOTOR VEHICLE
Original Filed March 17, 1933   4 Sheets-Sheet 1
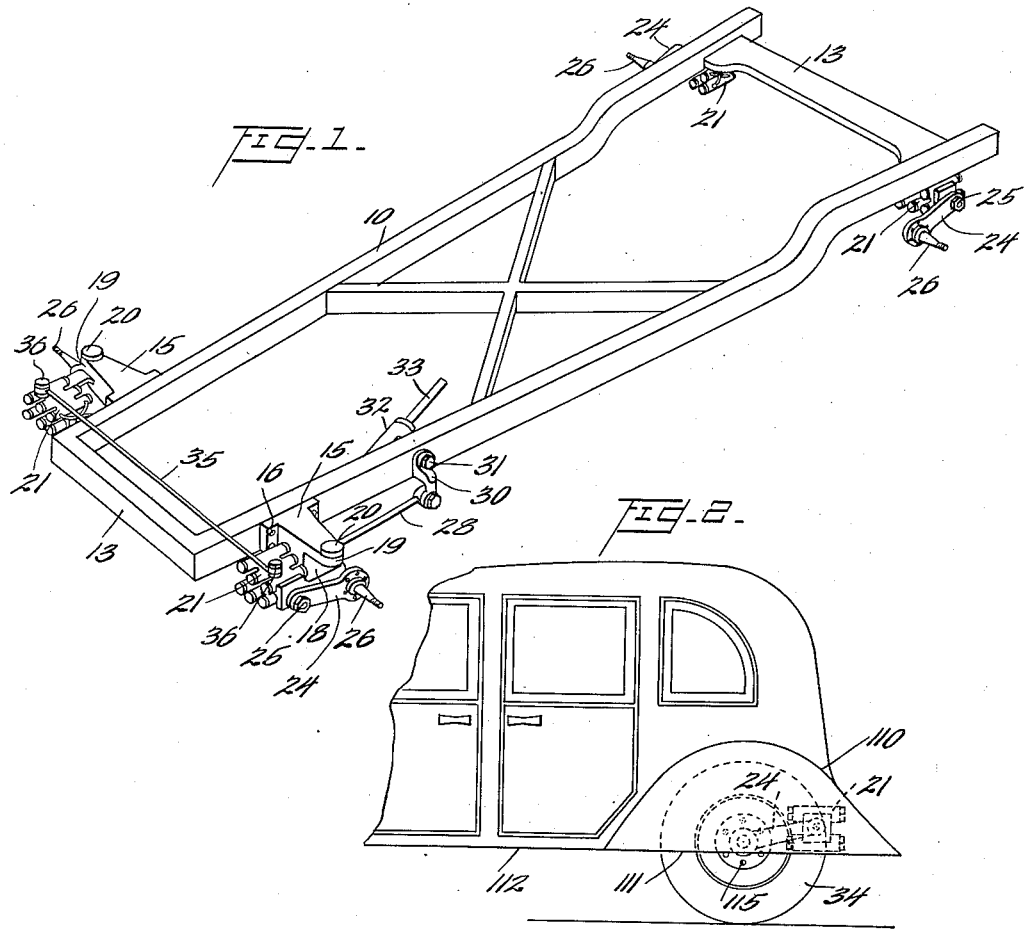
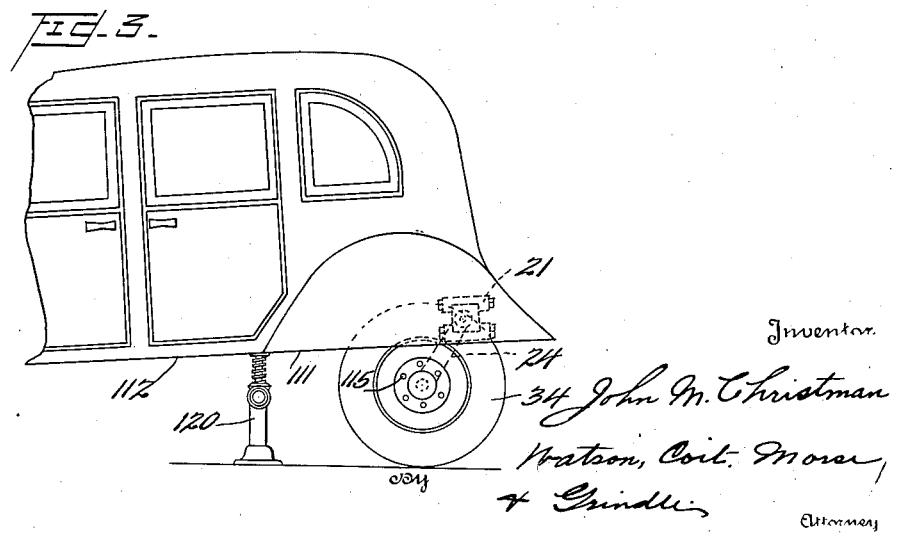

July 23, 1940.  J. M. CHRISTMAN  2,209,259
MOTOR VEHICLE
Original Filed March 17, 1933  4 Sheets-Sheet 2
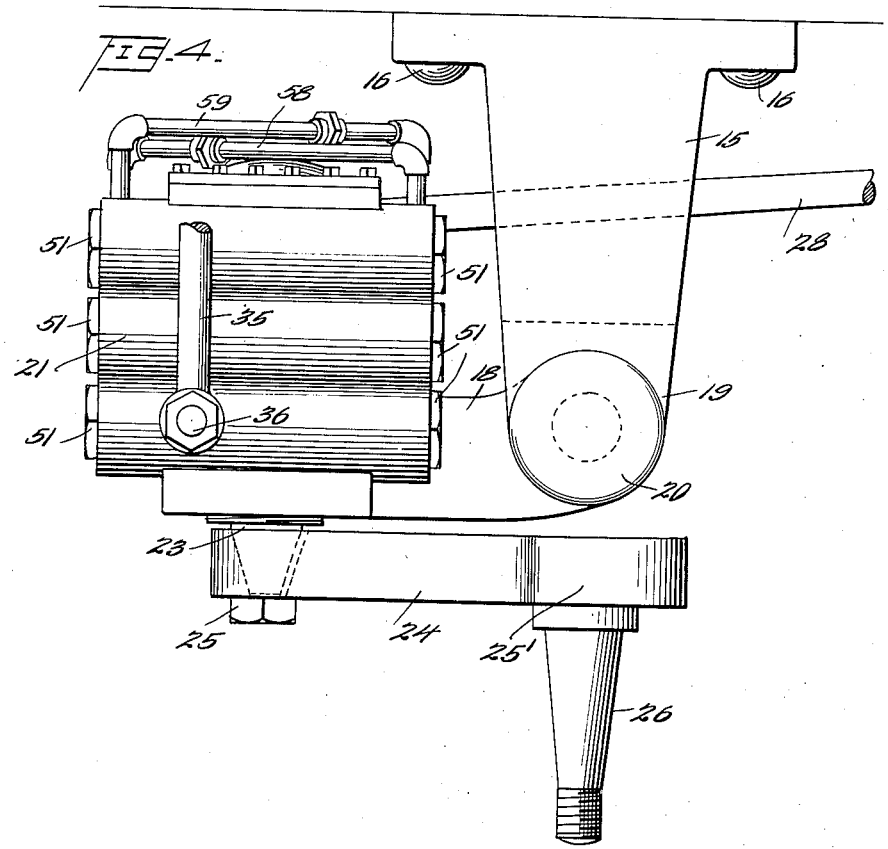
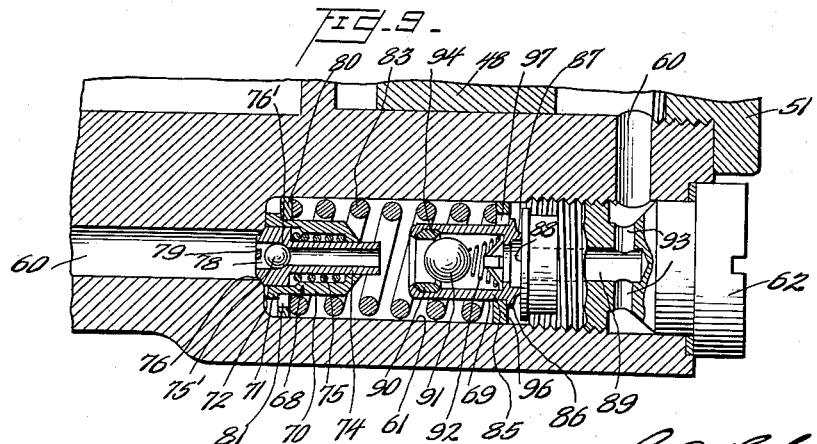
Inventor.
John M. Christman,
By Watson, Cott, Morse & Grindle
Attorneys July 23, 1940.   J. M. CHRISTMAN   2,209,259
MOTOR VEHICLE
Original Filed March 17, 1933    4 Sheets-Sheet 3
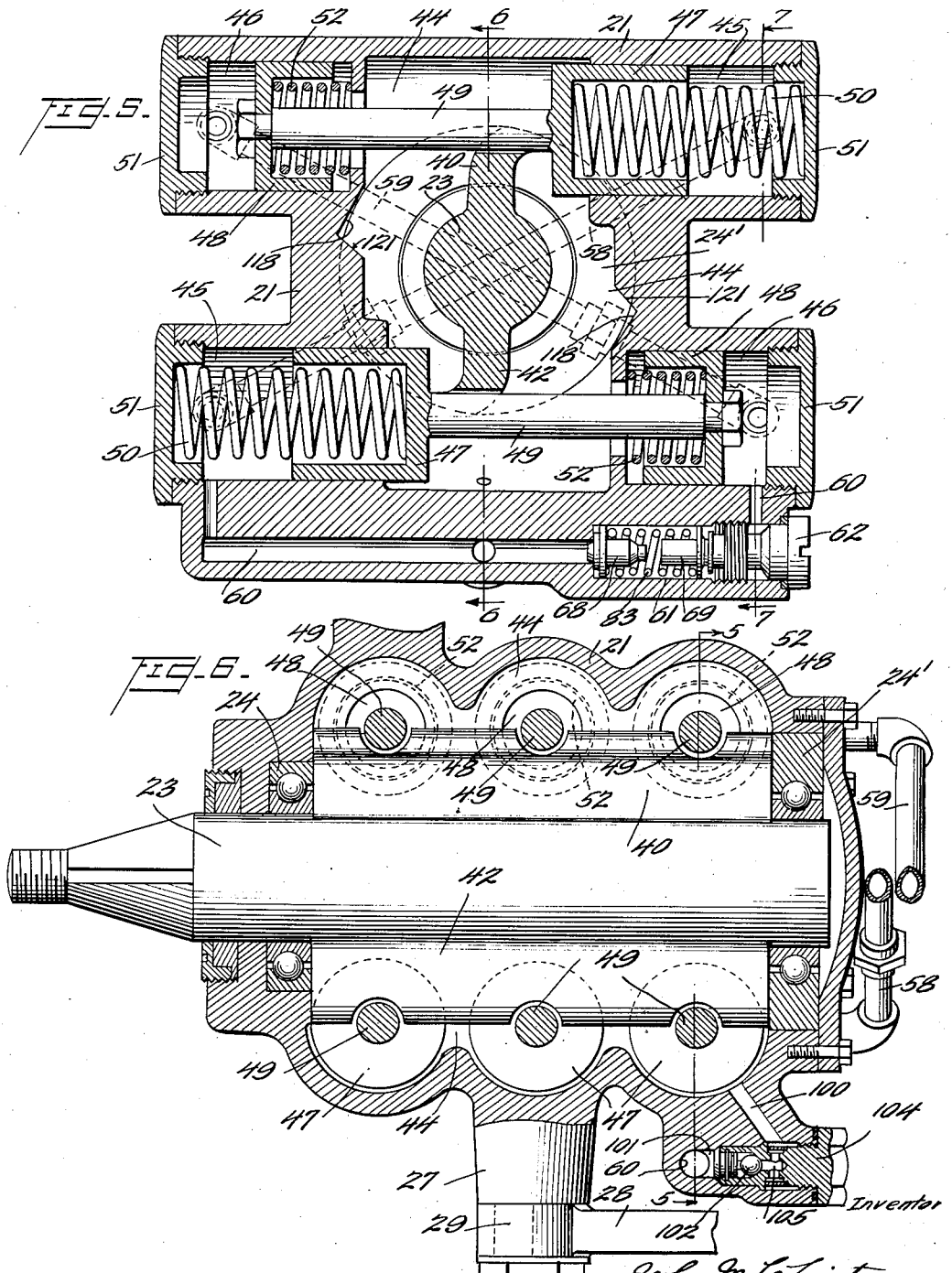

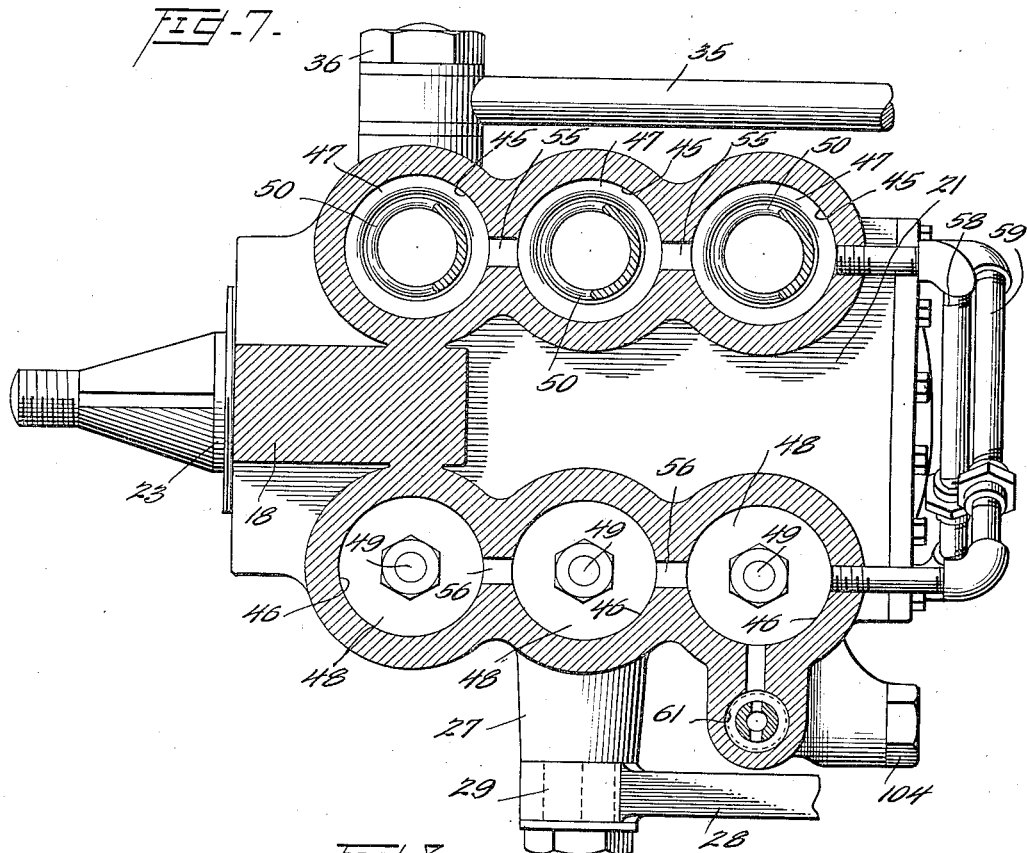
July 23, 1940. J. M. CHRISTMAN 2,209,259
MOTOR VEHICLE
Original Filed March 17, 1933  4 Sheets-Sheet 4

Patented July 23, 1940

2,209,259

UNITED STATES PATENT OFFICE 2,209,259

MOTOR VEHICLE

John M. Christman, Detroit, Mich., assignor to Packard Motor Car Company, Detroit, Mich., a corporation of Michigan Original application March 17, 1933, Serial No. 661,392. Divided and this application February 1, 1937, Serial No. 123,465

6 Claims. (Cl. 280—153)

This invention relates to motor vehicles and is more particularly concerned with vehicle wheel suspensions and wheel housings or fairings for use in conjunction therewith. It is the principal object of the invention to provide a wheel suspension which will permit the association with the road wheels of permanent lateral fairings.

It has heretofore been proposed, for the purpose of improving the appearance of vehicles and reducing the resistance to flow of air past the same, to provide wheel fairings at the sides of the road wheels, these fairings being removably secured to the adjacent fenders or body panels so that the wheels may be accessible for removal and replacement.

For instance, a detachable or displaceable plate or panel may be secured to the fender and may extend downwardly below the axis of the road wheel, terminating on a line which is substantially coextensive with the usual running board. In the event the vehicle frame is lowered to such an extent that no running board is necessary, the passengers entering the vehicle body directly from the road bed, the lower edge of the fairing may be substantially flush with the lower portion of the vehicle body. Thus in a streamlined vehicle in which the lower portion of the side of the vehicle body from front to rear is substantially or nearly flat, the wheels being housed entirely within the body and the more conventional fender being eliminated, the exterior surface of the detachable fairing may be coextensive with the face of adjacent body panel portions.

It is proposed by the present invention to provide a wheel suspension system in which these fairings are integral with or secured permanently to the adjacent fender or body panel, the arrangement being such as to permit the road wheel to be lowered to an extent not possible with present spring suspensions, in order that the bolts which secure the wheel in position may be rendered accessible for removal of the wheel without removing or displacing the wheel fairing or other body panel structure. In the preferred form of the invention it is possible to enclose the major portion of the outer face of the wheel and thus to materially improve appearance and streamlining of the vehicle.

Further objects and features of the invention will be apparent from the following description taken in connection with the accompanying drawings, in which Figure 1 is a perspective view illustrating a portion of a motor vehicle chassis to which the invention has been applied;

Figure 2 is a side elevation of the rear portion of a motor vehicle showing the road wheel in the position which it normally occupies;

Figure 3 is a view similar to Figure 2 illustrating the relative position of the vehicle body and road wheel when the latter is being removed for replacement;

Figure 4 is a plan view of a wheel suspension unit illustrating the application thereof to the steerable road wheel;

Figure 5 is a vertical section through the unit shown in Figure 4 and taken substantially on the line 5—5 of Figure 6;

Figure 6 is a vertical sectional view taken substantially on the line 6—6 of Figure 5;

Figure 7 is a vertical sectional view on the line 7—7 of Figure 5;

Figure 8 is a side elevation of the construction illustrated in Figure 4; and

Figure 9 is an enlarged sectional view of valve mechanism shown in Figure 5.

In order to facilitate an understanding of the invention, specific reference is made herein to various elements in the embodiment of the invention selected for the purpose of illustration. It will nevertheless be appreciated that by the use of specific language no limitation of the scope of the invention is thereby intended, but that various alterations of the construction shown and described are contemplated such as fall within the spirit of the invention. It will be noted that this application is a division of my prior filed application Serial No. 661,392, filed March 17, 1933.

Referring first to Figure 1 of the drawings, it will be observed that the vehicle frame is illustrated as comprising the usual side frame members 10, and transverse frame members 12 and 13. The specific construction of this frame is a matter of no importance, however, so far as the present invention is concerned.

It will be convenient to describe first the mechanism whereby the steerable road wheels at the forward end of the vehicle frame are supported for simultaneous steering movement and for relative vertical movement in response to road conditions. This mechanism comprises supporting brackets 15, one being located at each side of the vehicle, and bolted or otherwise rigidly secured to the outer face of the associated side frame member 10 as indicated at 16. Each of these supporting brackets carries a steering knuckle 18, the bracket 15 terminating in a forked portion 19 which receives the knuckle 18, and a king pin 20 passing through the bracket and the knuckle to support the latter for swinging movement in a substantially horizontal plane.

It may be observed here that the pivotal support for the steering knuckle is shown in a simple manner since the precise construction thereof is not an important feature of the invention. For instance, while the axis of the king pin is illustrated as substantially vertical, it will be understood that in practice this axis would be inclined to the vertical to afford the usual caster effect. Furthermore, although the term "steering knuckle" is used herein for convenience, this term is intended to cover any device or member supported for movement in a horizontal or nearly horizontal plane and adapted to carry a road wheel, so that the vehicle may be steered by movement of the knuckle.

The steering knuckle 18 is formed to provide a forwardly directed substantially longitudinally extending arm as shown more particularly in Figure 4 of the drawings and carries at its forward end a housing 21. Thus the knuckle arm may be either integrally formed with the housing 21 or be rigidly secured thereto so that the housing partakes of steering movement with the steering knuckle 18.

By reference to Figures 4 and 6 it will be observed that a shaft 23 is journalled as indicated at 24' within the housing for rotation about a substantially horizontal axis, the shaft 23 extending laterally from the housing and being provided with a longitudinally extending arm 24, which is rigidly secured to the shaft for rotative movement therewith, for instance by means of a nut 25 threaded on the end of the shaft.

The free end of the arm 24 is provided with a disk-shaped portion 25' to which may be bolted or otherwise secured the usual brake backing plate, and is also provided with a laterally extending wheel spindle 26, the latter being preferably disposed adjacent the king pin 20 and serving to support the usual vehicle road wheel which may be journalled thereon in any conventional manner.

The arm 24 normally occupies a substantially horizontal position and means, hereinafter described, are provided within the casing 21 to yieldingly resist swinging movement of the arm in a vertical plane and resultant oscillation of the shaft 23.

At its lower side the casing 21 is provided with a depending arm 27 to which the conventional drag link 28 is pivotally connected as indicated at 29, the drag link being in turn pivotally connected to a steering arm 30 carried by a shaft 31 extending through the side frame member 10 and operable by gearing within a steering gear housing 32, the latter being disposed at the lower end of the steering column 33 and being operable from the usual steering hand wheel (not shown).

A cross tie rod 35 is also provided to connect the housing 21 at opposite sides of the vehicle and the knuckles 18 which carry these housings for steering movement in unison, for instance the rod 35 may be pivotally connected as indicated at 36 to the upper side of each housing and may extend across the vehicle frame.

Referring now to Figures 5, 6, and 7 illustrating the mechanism within the housing 21 for resisting rotation of the shaft 23, it will be seen that this shaft is provided with arms 40 and 42 which extend in opposite directions within the chamber 44, the latter serving as a fluid supply reservoir as hereinafter described. The housing 21 is also formed to provide a plurality of substantially horizontally disposed cylinders 45 and 46 leading from the chamber 44, those chambers having similar functions being designated by the same reference character.

In the drawings twelve of these cylinders have been shown, the cylinders being arranged in two substantially horizontal planes, one above the other, and the pairs of cylinders in each plane being opposed and substantially coaxial.

A piston 47 is operable in each of the cylinders 45 and pistons 48 reciprocate within the cylinders 46, each pair of oppositely disposed pistons 47 and 48 being connected for reciprocation, for instance by means of a rod 49 extending between and secured to or formed integrally with each piston. The outer end of each cylinder is closed by means of threaded elements 51, and coil springs 50 are introduced in each cylinder 45 between the closure element and the piston 47 to resist outward movement of the piston. Coil springs 52 are also introduced in the cylinders 46, these springs being compressed between the pistons 48 and the inner ends of the cylinders.

The ends of the arms 40 and 42 engage the inner ends of the pistons 47 and it will be observed from Figure 5 of the drawings that rotation of the shaft 23 in a clockwise direction will effect reciprocation of the pistons in all four of the cylinders shown therein and compression of the coil springs in each of the cylinders, such clockwise rotation of the shaft 23 resulting from upward movement in a substantially vertical plane of the arm 24 and the road wheel carried thereby. It will thus be seen that the coil springs, of which twelve are shown, afford the sole support for such portion of the vehicle load as is carried by the associated road wheel.

When upward movement of the road wheel occurs, for instance as the result of an obstruction in the road bed, the pistons 47 will be moved toward the outer ends of the associated cylinders 45 and the pistons 48 will be withdrawn from the outer ends of the cylinders 46 with the result that any fluid within the cylinders 45 will be compressed and fluid within the cylinders 46 will be expanded.

On downward movement of the road wheel with respect to the vehicle frame the reverse of this operation will take place, fluid being compressed in the cylinders 46 by the action of the coil springs on the pistons 48, whereas fluid within the cylinders 45 will be expanded, the action of the springs being thus effectively damped. It is therefore convenient to designate the cylinders 45 which serve primarily to resist upward movement of the road wheel as compression cylinders and the cylinders 46, which function principally to resist excessively rapid expansion of the springs, as rebound cylinders, all of the pistons moving in unison and the rebound and compression cylinders functioning in opposite phase relation.

The compression cylinders 45 are in open communication so that they function in effect as a unit. Thus the cylinders 45 disposed in the upper horizontal plane may be connected by fluid passages 55 extending through the walls defining the respective cylinders and the rebound cylinders 46 in the lower horizontal plane are connected by passages 56, as shown more particularly in Figure 7 of the drawings. It will be appreciated that similar communication is effected between the rebound cylinders 46 in the upper horizontal plane and between the compression cylinders 45 in the lower horizontal plane. Furthermore, a conduit 58 extends between and communicates with the end compression cylinders 45 in the upper and lower horizontal planes and similarly a conduit 59 communicates with the end rebound cylinders 46 in the upper and lower horizontal planes. It will thus be seen that on upward movement of the vehicle road wheel, fluid within all of the compression cylinders 45 will be compressed to a substantially equal extent by reason of the fact that these cylinders are all in communication whereas on downward movement of the road wheel the fluid in the rebound cylinders 46 will be compressed to an equal extent. Thus if a single passage is provided between one of the compression cylinders and one of the rebound cylinders, fluid will be forced through the passage from all of the compression cylinders into all of the rebound cylinders or vice versa depending on the direction of movement in a vertical plane of the road wheel.

Such a passage is indicated at 60 and is shown more particularly in Figure 5 of the drawings, this passage being enlarged intermediate its ends to form a valve chamber 61 for controlling the flow of fluid between the two sets of cylinders, this enlarged chamber being preferably drilled from one end of the casing, the outer end of the chamber being closed by means of a threaded plug 62. It is desirable that the fluid flow between the compression and rebound cylinders through the connecting passage 60 be so controlled as to provide the necessary resistance to movement of the pistons on the occurrence of vertical movement of the road wheels as is the customary practice in shock absorbing devices.

The desired control may be effected by valve mechanisms 68 and 69 located in the enlarged portion 61 of the passage 60, these valve mechanisms being illustrated more specifically in Figure 9 of the drawings. Thus the valve mechanism 68, which serves to control flow of fluid from the compression cylinders into the rebound cylinders may comprise a substantially cylindrical housing 70 having a radial flanged portion 71 at one end which normally seats against the adjacent end wall of the chamber 61. This flanged portion 71 is provided at intervals about the periphery thereof with radially extending slots 72 to afford a restricted passage for fluid. An element 74 which is likewise substantially tubular is slidably supported within the housing 70 and is urged in one direction by means of a coil spring 75, the end face 76 of the element 74 seating in the mouth of the passage 60 at the left-hand end of the chamber 61 as viewed in Figure 9 to normally close the passage.

Flow of fluid to the right through the interior of the element 74 is prevented by a valve ball 75' which is adapted to engage a seat 76' formed within the element 74, this ball floating in an enlarged recess 78 within the element 74 and being retained against displacement out of the recess by means of projections 79 formed on the element 74 adjacent its outer end.

A collar 80 provided with a plurality of arcuate recesses 81 permitting the passage of fluid therethrough engages the flanged portion 71 of the housing 70 and is in turn engaged by a relatively stiff coil spring 83 which maintains the collar 80 and housing 70 normally in the position in which it is shown in Figure 9.

It will be observed from the construction thus far described that when fluid is forced from the compression cylinders and passes to the right in the passage 60, the pressure will force the element 74 to the right against the action of the coil spring 75, thus permitting flow of fluid through the slots 72 in the housing 70 and the openings 81 in the collar 80, affording a relatively restricted fluid passage.

Referring now to the valve mechanism 69 at the right-hand side of the valve chamber 61, it will be observed that this comprises a substantially tubular housing 85 provided with a radially extending flanged portion 86 and having the end face 87 thereof normally seated on the inner face 88 of the plug 62. This plug is provided with a longitudinally extending fluid passage 89 and laterally extending passages 93, the latter communicating with the adjacent portion of the passage 60. The housing 85 is formed to receive a valve seat member 90 adjacent one end thereof, this valve seat member being engaged by a valve ball 91 which is urged toward the seat by means of a coil spring 92. At the point of contact between the seat 90 and the ball 91, the latter is provided with a plurality of small orifices 94 which permit limited flow of fluid therethrough even though the ball 91 is properly seated, for a purpose hereinafter explained.

A collar 96 provided with a plurality of arcuate openings 97 therein engages the flanged portion 86 of the housing 85 and is in turn engaged by the coil spring 83, so that the housing 85 and collar 96 normally occupy the position shown in Figure 9 of the drawings with the end portion 87 of the collar seating on the inner end of the plug 62 about the passage 89.

When fluid is forced from the rebound cylinders it flows through the passages 93 and 89 and the pressure thus developed moves the housing 85 to the left to permit passage of fluid through the openings 97 in the collar 96. With the exception of the small amount of fluid which is permitted to pass between the ball 91 and the seat 90, as hereinbefore mentioned, fluid can be forced from the rebound to the compression cylinders only by moving the housing 85 against the action of the relatively stiff spring 83, whereas the housing 70 need not be shifted from its seat in order to permit normal fluid flow from the compression to the rebound cylinders. Thus more resistance is offered to passage of fluid from the rebound cylinders than from the compression cylinders. It will nevertheless be observed that when excessive pressures are developed in the compression cylinders, for instance as the result of sudden upward movement of the vehicle road wheel on encountering a large obstruction, such pressure will be sufficient to overcome the resistance of the spring 83 and force the housing 70 to the left, and thus the degree of restriction to flow is reduced materially since fluid may pass between the seating portion 76 of the housing and the opening at the adjacent end of the chamber 61. In this manner the development of excessive pressure within the compression cylinders can be avoided, together with the difficulties attendant upon the development of such pressure, for instance the possible expansion and seizing of the pistons within the compression cylinders.

In order to compensate for the wear of the pistons and the resultant leakage of fluid therefrom, the orifices 94 hereinbefore referred to are provided. When the apparatus is first installed, these orifices permit limited flow in both directions around the ball 91 and this small flow of fluid is sufficient to permit the shock absorber to function properly. As the pistons become worn, and less pressure is applied to the fluid in the working cylinders, these small orifices will likewise tend to become closed by reason of wear on the seat 90 so that approximately the same amount of fluid is caused to flow after the apparatus has been in service for some time. Thus uniformity of action of the shock absorber is secured regardless of the length of service.

It will be noted that by means of this construction the degree of resistance offered by the valve mechanisms 68 and 69 to movement of fluid in opposite directions therethrough may be independently determined, the ball 75 permitting free movement of fluid through the element 74 from the rebound cylinders and the ball 91 yielding to permit free movement of fluid through the housing 85 from the compression cylinders. Thus the two valve elements may be initially formed to provide different degrees of resistance to flow in opposite directions.

As mentioned hereinbefore, the chamber 44 serves as a supply reservoir and is preferably initially filled with the working fluid. As the fluid in the system including the cylinders and the connections therebetween is depleted owing to leakage past the pistons or otherwise, fluid is automatically withdrawn from the supply chamber 44 and introduced in the system. This may be conveniently effected by the means shown more particularly in Figure 6 of the drawings and comprising a passage 100 communicating with the supply chamber 44 and a passage 101 communicating with the passage 60, a spring pressed check valve 102 being interposed between the passages 100 and 101 to permit flow therethrough in one direction only. Thus the housing may be recessed to receive a threaded plug 104 having a duct 105 therein communicating with the passage 100, the spring pressed valve element 102 serving to normally close the outer end of the passage 105. As the fluid in the system including the cylinders is reduced in quantity, the pressure in the passage 60 will be correspondingly lowered and fluid will be drawn through the communicating passages 100 and 101 into the system to automatically replenish the fluid.

Referring now to Figures 1 to 3 of the drawings, in which the support for the road wheels at the rear of the vehicle is shown, it will be appreciated that the same spring supporting and shock absorbing unit may be employed as is illustrated in connection with the steerable road wheels. Thus the housings 21 may be secured in any convenient manner directly to the side frame members 10, these housings serving as a support for the arms 24 which carry the road wheel spindles 26 on which the road wheels 34 are rotatably supported. It will be understood that suitable shafting, not shown in the drawings, is provided for driving these road wheels from the usual differential gearing, which may be supported directly on the vehicle frame.

The employment of an individual wheel suspension such as that disclosed herein and the resultant elimination of springs between the vehicle frame and body makes it possible to support the vehicle body directly on the frame and thus the body may be lowered to such an extent that the usual running board may be eliminated if desired. The rear fender 110 is preferably formed so as to extend across the entire upper portion of the road wheel and is illustrated in the drawings with the lower edge 111 thereof disposed substantially flush with the lower edge 112 of the vehicle body and forming in effect a continuation of the lower body line. This arrangement may be alternatively described as constituting a conventional fender having an integral apron or fairing extending across at least about half of the wheel face. While this construction improves the appearance of the vehicle by concealing to a large extent the vehicle wheel which is frequently coated with mud and grease under ordinary conditions of service, and further improves the streamlining of the vehicle and reduces wind resistance, it offers difficulties in practice since the bolts 115 which are used to secure the conventional replaceable road wheel in position are not readily accessible and it is furthermore difficult to remove the wheel even after the bolts are withdrawn.

To obviate this difficulty the present invention contemplates a modification of the wheel support whereby it is possible to drop the vehicle wheel much further than has been permitted heretofore. Thus it will be seen by reference to Figure 5 of the drawings that the wall of the chamber is cut away as indicated at 118 on either side of the shaft 23 to permit the arms 40 and 42 to swing through arcuate paths of nearly 90°, it being observed that the arms 40 and 42 are not secured to the cylinders 47 but merely engage the latter to move the cylinders in one direction only. Thus when a jack 120 is placed under the vehicle frame and the vehicle is elevated, the wheel may swing down freely to the position in which it is shown in Figure 3, and even further if necessary, to provide access to the bolts 115 and to permit the wheels to be readily removed from beneath the fender 110, the arms 40 and 42 moving into the recesses 118 in the wall of the chamber 44. It is of course desirable that the downward movement of the wheel be limited so that on continued elevation of the vehicle the wheel to be removed may be lifted above the road surface. For this purpose the recesses 118 are so formed as to present abutments 121 which serve to engage and limit the movement of the arms 40 and 42. Thus after the vehicle has been jacked up to an extent sufficient to permit the arms 40 and 42 to move into engagement with the abutments 121, further elevation of the vehicle effects removal of the road wheel from the road surface.

When the vehicle is again lowered, the wheels move upwardly to the position shown in Figure 2, and the arms 40 and 42 move into abutting relation with the pistons 47, it being appreciated that the weight of the vehicle is at all times sufficient to maintain engagement between these arms and the associated cylinders.

It will be appreciated that permanent fairings, in conjunction with the general type of wheel suspension disclosed herein, may be applied to either the front or the rear wheels of the vehicle and to either steerable or non-steerable wheels. It will also be understood that the fairing may form part of a continuous and substantially flat outer body panel in vehicles from which the more conventional type of fender is eliminated. Various modifications of the wheel suspension structure described herein, in which the wheels may be lowered to a sufficient extent to permit their removal from beneath a permanent fairing of substantial area, will readily occur to one skilled in the art to which the invention relates.

Having thus described the invention, what is claimed as new and desired to be secured by Letters Patent is:

1. In a motor vehicle, the combination with a vehicle frame, of a road wheel, an arm supporting said road wheel and normally extending in a substantially horizontal direction, means supporting said arm for swinging movement on said frame, yielding means associated with said last named means for resisting movement of said arm in an upward direction only, said arm being movable freely in a downward direction, and a fender supported on said frame and having an apron integral therewith, said apron extending over at least about half of the outer face of said wheel, said arm and wheel being movable downwardly to an extent sufficient to permit ready removal of the wheel.

2. In a motor vehicle, the combination with a vehicle frame, of a road wheel supported on said frame for rising and falling movement with respect thereto, means acting between said frame and wheel and yieldingly resisting rising movement of the latter, a body structure carried by said frame, said structure including a wheel fairing covering at least half of the lateral face of said wheel, and means supporting said road wheel on said frame, said last named means affording downward movement of said wheel to an extent sufficient to permit removal thereof without displacement or removal of said fairing.

3. In a motor vehicle, the combination with a vehicle frame, of road wheels supported on said frame for independent rising and falling movement with respect thereto, a body structure supported by said frame and normally concealing at least about half of the lateral face of each wheel, and means supporting said road wheels and affording downward movement of the latter to an extent sufficient to permit ready removal of the wheels without removal of any portion of said body.

4. In a motor vehicle, the combination with a vehicle frame, of road wheels supported on said frame for independent rising and falling movement with respect thereto, a body structure supported by said frame and normally concealing at least about half of the lateral face of each wheel, and means supporting said road wheels and affording downward movement of the latter to an extent sufficient to permit ready removal of the wheels without removal of any portion of said body, said means including an arm carrying each road wheel and pivoted on said frame, and means yieldingly resisting rising movement only of said arms.

5. In a motor vehicle, the combination with a vehicle frame and a body carried by said frame and including exterior panels, of road wheels supported on said frame for independent rising and falling movement with respect thereto, said panels covering at least about half of the lateral faces of said wheels, and means supporting said wheels for rising and falling movement with respect to said frame, said means being constructed to afford downward movement of said wheels to an extent sufficient to permit ready removal of said wheels without removal or displacement of any portion of said panels.

6. In a motor vehicle, the combination with a vehicle frame and a body carried by said frame and including exterior panels, of road wheels supported on said frame for independent rising and falling movement with respect thereto, said panels covering at least about half of the lateral faces of said wheels, means supporting said wheels for rising and falling movement with respect to said frame, said means being constructed to afford downward movement of said wheels to an extent sufficient to permit ready removal of said wheels without removal or displacement of any portion of said panels, and means positively limiting such downward movement.

JOHN M. CHRISTMAN.